Jan. 17, 1933.                R. SARDESON                1,894,708
BOLT
Original Filed Aug. 11, 1930

Inventor:
Robert Sardeson,
By Dyrenforth, Lee, Chritton & Wiles,
Attys.

Patented Jan. 17, 1933

1,894,708

UNITED STATES PATENT OFFICE

ROBERT SARDESON, OF MINNEAPOLIS, MINNESOTA, ASSIGNOR TO LEWIS BOLT & NUT COMPANY, A CORPORATION OF MINNESOTA

BOLT

Continuation of application Serial No. 474,444, filed August 11, 1930. This application filed July 7, 1932. Serial No. 621,246.

The invention relates to bolts and particularly to bolts of the type provided with fins under the heads thereof.

This application is a continuation of my co-pending application, Serial Number 474,444 filed August 11, 1930.

A preferred form of the invention is embodied in a screw-threaded bolt provided with a relatively thin head adapted to be drawn into a wooden beam through which the bolt is passed, a nut being employed on the screw-threaded shank of the bolt to draw the relatively thin head into the wooden beam. The bolt is provided with integral triangular-shaped fins underneath the head which fins are also drawn into the wooden beam. One side of each fin is disposed in a plane extending substantially radially from the shank, the other side of the fin being disposed at an acute angle to said plane to provide a relatively sharp cutting edge along the outer edge of the fin. This cutting edge facilitates the task of drawing the fin into the wooden beam. The radially extending surface of the fin prevents the bolt from turning in a direction which will cause it to unscrew itself from the nut threaded thereon.

Figure 1:
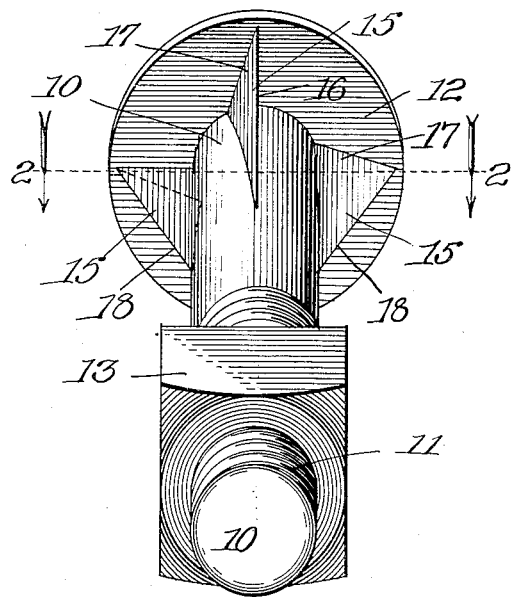

Other advantages will become apparent as the following detailed description progresses, reference being had to the accompanying drawing wherein Figure 1 is a perspective view of a bolt which embodies the invention.

Figure 2:
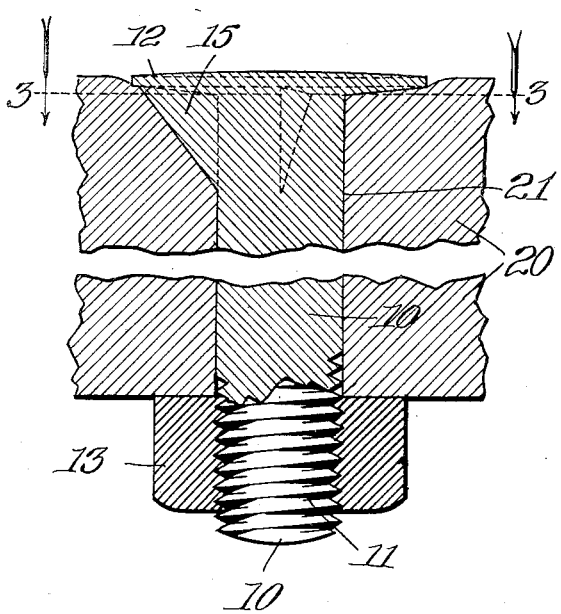
Figure 3:
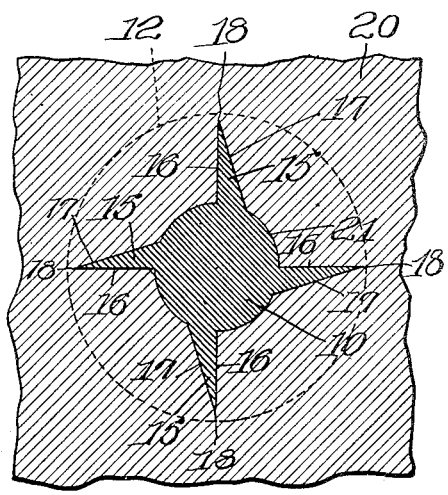

Figure 2 is a side elevation of the improved bolt, the bolt being shown in connection with a wooden beam through which it extends, and Figure 3 is a section taken on line 3—3 of Figure 1.

Referring to the drawing, the reference character 10 designates the shank of the improved bolt, the shank 10 being provided with screw threads at one end and an integral head 12 at its other end. Screw-threaded upon the shank 10 is a nut 13.

The head 12 is a thin disc-like member tapering slightly from its central portion, where it is thickest, to the periphery thereof. This taper facilitates the manufacture of the improved bolt.

Formed integral with the disc-like head 12 and the shank 10 are a plurality of fins 15. As indicated at 16 one side of each fin 16 is disposed in a plane extending substantially radially from the longitudinal axis of the shank 10, the other side 17 of each fin being disposed at an acute angle to the corresponding side 16 so that each fin 15 is provided with a relatively sharp cutting edge 18 extending from a point near the periphery of the head 12 to a point on the shank 10.

Figures 2 and 3 show the improved bolt projecting through a beam 20. When the bolt is to be assembled with the beam, a hole 21 is preferably drilled therethrough. The bolt is then passed through a hole and the nut 13 is applied thereto. The nut is tightened until the disc-like head 12 is drawn into the beam so that its outer surface is approximately flush with the surface of the beam. When the nut is tightened in this manner, the fins 15 are drawn into the wooden beam is illustrated in Figures 2 and 3. The radially extending surfaces 16 of the fins 15 engage the wooden beam in such manner that they prevent the bolt from turning in a direction which will cause the nut 13 to be loosened on the bolt.

The improved bolt is particularly adaptable for railroad car construction and almost any industry where wood construction is a factor. A feature of the invention is that the head of the bolt is sufficiently thin to be drawn substantially flush with the surface of the wood, the thin disc-like head being reenforced by the fins so that it does not fail when it is used in this manner. The cutting edges of the fins insure that the fins and the disc-like head may be drawn into the wood.

In some instances, the top surface of the improved bolt is machined to a plane surface. This accentuates the disc-like appearance of the head.

While I have shown and described certain embodiments of my invention, it is to be understood that it is capable of many modifications. Changes, therefore in the construction and arrangement may be made without departing from the spirit and scope of the invention as disclosed in the appended claim, in which it is my intention to claim all novelty inherent in my invention as broadly as possible, in view of the prior art.

I claim:

A screw-threaded bolt comprising a thin disc-like head adapted to be drawn into a wooden beam through which the bolt is passed, and a substantially triangular-shaped fin integral with the shank and head of said bolt and extending along the under side of said head from the shank to a point substantially at the periphery of said head, one side of said fin being disposed in a plane extending substantially radially from said shank, and the other side of said fin being disposed at an acute angle to said plane to provide a relatively sharp cutting edge along the outer edge of said fin whereby said fin may be forced readily into said wooden beam, said radially extending surface of said fin being adapted to engage the wooden beam to prevent the bolt from turning in the direction necessary to unscrew it from a nut threaded thereon.

In witness whereof, I have hereunto subscribed my name this 21st day of June, 1932.

ROBERT SARDESON.